Nov. 27, 1956 L. PÉRAS 2,771,867
INTERNAL COMBUSTION ENGINES
Filed Oct. 29, 1953 3 Sheets-Sheet 1

Nov. 27, 1956     L. PÉRAS     2,771,867
INTERNAL COMBUSTION ENGINES
Filed Oct. 29, 1953     3 Sheets-Sheet 2

Nov. 27, 1956  L. PÉRAS  2,771,867
INTERNAL COMBUSTION ENGINES
Filed Oct. 29, 1953  3 Sheets-Sheet 3

United States Patent Office 2,771,867
Patented Nov. 27, 1956

2,771,867

INTERNAL COMBUSTION ENGINES

Lucien Péras, Billancourt, France, assignor to Regie Nationale des Usines Renault, Billancourt, France Application October 29, 1953, Serial No. 388,999

Claims priority, application France November 7, 1952

16 Claims. (Cl. 123—112)

In diesel engines, the power output is normally regulated by the delivery of the injection pump in which the toothed rack controlled by the accelerator varies at will the delivery per revolution of this pump. The power output is the greater, the greater the volume of fuel introduced into each cylinder. On the other hand the amount of air always remains the same. In principle, operation is always with excess air, whatever the fuel charge.

Unfortunately it is impossible to operate on the same principle in four-stroke or two-stroke combustion cycles. This is due to the fact that combustion is only possible within well defined limits of richness. Thus it is always necessary to regulate the amount of petrol introduced substantially in proportion to the amount of air. The amount of air is controlled by a butterfly valve mounted on the induction tube and the appropriate proportion of petrol is obtained automatically whatever the running conditions and load.

This method has two main types of disadvantages:

In the first place the correct control of the mixture is always a delicate matter both with the conventional carburettor and with various other induction methods directed more particularly towards this problem.

In the second place, the thermal output is greatly reduced at reduced charges, because it is impossible to change the compression ratio which should be much higher to compensate for the greater proportion of losses through the walls of the cylinders of the engine.

This is why, for some time, attempts have been made to avoid the necessity for this mixture control. Numerous attempts have been made to stratify the mixture introduced into the cylinder, that is to say to produce a mixture which is rich in the vicinity of the sparking plug and increasingly poor in proportion to the distance therefrom. This method has, in fact, made it possible to extend considerably the limits of average richness for combustion mixtures and consequently has made it possible partially to utilize the variation in richness as a means of varying the power output. But apart from the difficulty of producing such a stratification under different running conditions, it has hitherto been impossible to eliminate the butterfly-throttle entirely, or to operate at very reduced charges with the full air intake.

The object of the invention is to solve this problem by an entirely different process, by deliberately abandoning continuous methods in favour of intermittent methods of regulation.

All or nothing regulating methods are already known, being used principally in stationary engines and consisting in cutting the fuel admission when the selected speed is exceeded slightly, thus causing the engine to slow down immediately, and in restoring the feed as soon as the speed has fallen below the selected value. This system is applied chiefly to single-cylinder engines.

The invention relates both to single-cylinder and to multi-cylinder engines. The case of the single-cylinder ones will be considered first.

It comprises selecting an operating period based on a number of firing cycles which are equal, or which are a denominator of the charge fraction in question and, during this period, in injecting fuel only for a number of cycles equal to the numerator of the charge fraction.

Assume, for example, a single-cylinder engine in which there is no butterfly-throttle for the air, and into which there is injected regularly, at each firing cycle, the optimum quantity of petrol to obtain the best combustion.

This engine, operating at full charge, receives an injection of petrol per firing cycle. For operation under 5/9 load, for example, the period of operation under consideration would be nine cycles, but for five of these cycles the fuel would be injected and during the other four it would not be injected, the air continuing to enter in the same manner, and ignition taking place as usual. In the following period of nine cycles the injection would be distributed in the same way. Changing to 2/9 load for example, petrol would be injected only during two cycles out of nine. The greater the number of the denominator, that is to say the length of the period, the further the sub-division of the load can be carried. The injection cycles will be distributed as regularly as possible throughout the period.

For the two-stroke engine, the firing cycle will correspond to one driving revolution and for a four-stroke engine the cycle will correspond to two driving revolutions.

The injection may be cut off by opening a by-pass valve between the delivery pipe from the injection pump and the injector. The by-pass valve may be controlled electrically or pneumatically or mechanically.

Several embodiments of the invention are hereinafter described by way of example, with reference to the accompanying drawings.

Figure 1:
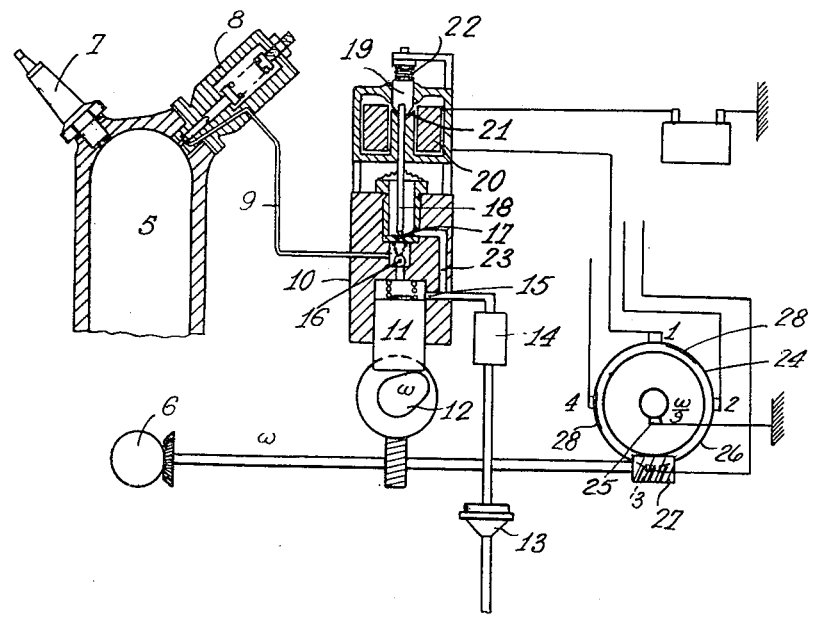
Fig. 1 is a partly diagrammatic view, partially in section, of a two-stroke engine having electric cut-off means embodying features of the present invention.

The engine 5 with its crankshaft 6 receives scavenging air in the normal manner through ports which are not illustrated in the drawing; it is equipped with a sparking plug 7 and an injector 8; the petrol, under the selected injection pressure, reaches the injector through a pipe 9 from the pump 10.

This pump comprises a piston 11, operated by a cam 12 rotating at crankshaft speed. The shaft of the cam 12 is suitably fixed in relation to the crankshaft to obtain the required injection timing. The petrol is supplied under a certain pressure by the fuel pump 13, passes through the filter 14, and emerges through the aperture 15. When the piston 11, pushed by the cam, closes the aperture 15 again, it drives the petrol into the pipe 9 through the valve 16. A by-pass 17 is normally closed by a needle 18 held in position by the movable core 19 of an electromagnet 20. When the current is applied to the electromagnet, the air-gap of this electromagnet is very small and the portative force of the magnet is amply calculated so that the valve 17 will remain firmly closed under the injection pressure. If, on the other hand, no current is applied to the electromagnet, the core 19 no longer rests on the needle 18 except to the extent of the thrust of the spring 22 (which is very small) and on the following injection, the needle 18 is raised before the injection pressure can be built up in the pipe 9 and the injector 8. The petrol thus returns through the passage 23 to the intake. No petrol injection takes place in the cylinder 5 although the air charge is normal. The plug 7 thus produces a spark without any result. One of the terminals of the electromagnet is connected to the positive pole of the battery, the other terminal is earthed by means of the contact stud 1 of the rotary distributor 24 and the brush 25. This distributor is driven by a wheel 26 and a worm 27 from the crankshaft 6 of the engine.

Since it is a two-stroke engine in the case in question, with the firing cycle equal to one revolution of the crankshaft, if the denominator of the charge fraction is 9, the distributor speed will be ω/9. This distributor carries a certain number of insulating sectors such as 28, which cut the current when they pass under the contact 1. Each sector represents 1/9 of the circumference, that is to say, one cycle, and is separated from another sector by a whole number of cycles. In Figure 1, these two insulating sectors are equidistant by 2/9, and there are therefore seven injections per period of nine cycles, the charge being 7/9.

Figure 2:
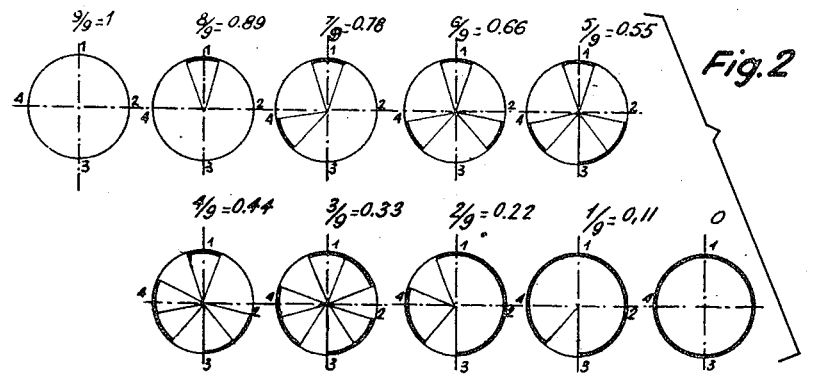
Fig. 2 is a diagrammatic view of the distributor sections of the arrangement shown in Fig. 1.

It is obvious that in the following period of nine cycles the distributor will have completed one revolution and the charge will be exactly the same. There is therefore a clearly defined distributor unit for each charge fraction. To change the charge fraction it is therefore necessary to change the distributor unit which is displaced in front of the contact 1. For this purpose a series of distributor units are arranged adjacent each other on the same spindle as shown in Figure 2 and, still assuming a charge subdivided into 9, it will be seen from Figure 3 that there are ten distributor units available.

The first, which has no insulating sector, represents 9/9 of the full charge.

The second, which has one insulating sector, represents the charge 8/9.

The third, with two insulating sectors, represents the charge 7/9.

The fourth, with three insulating sectors, represents the charge 6/9.

The fifth, with four insulating sectors, represents the charge 5/9.

The sixth, with five insulating sectors, represents the charge 4/9.

The seventh, with six insulating sectors, represents the charge 3/9.

The eighth, with seven insulating sectors, represents the charge 2/9.

The ninth, with eight insulating sectors, represents the charge 1/9.

The tenth, entirely insulating, represents no charge.

To change over from one charge fraction to another, the distributor drum, consisting of the assembly of these distributor units, is displaced axially in front of the contact 1, by means of the spring 29, actuated by the accelerator pedal 30.

The operation of the device is as follows:

The movement of the accelerator pedal is continuous whereas that of the distributor drum is intermittent. It is therefore clear that at a given moment the contact 1 will straddle two distributor units, for example 6/9 and 5/9. In this case it is obvious that the higher charge fraction will prevail. There is no need to fear that the contact will be inadequate in this case because the current necessary for closing the electromagnet is very small. Moreover the break will take place both in the direction of rotation of the drum and in the direction of its translation.

Arising out of the preceding comment, the following condition is necessary.

When the injection has been cut off by an insulating sector at a given charge, it should remain cut-off on the same sector in all the lower charges, otherwise there would be a risk, when the contact 1 touched two adjacent distributors, of having a higher charge than either of the two charges in question. This arrangement is shown on Figure 2, for example, where the insulating sector of the distributor 8/9 remains insulating in all the others, the two distributor sectors 7/9 remain in all the others and so on.

It will thus be observed that the denominator of the charge fraction cannot be chosen completely at random if it is desired to keep the injections sufficiently equidistant.

The angle of the insulating sector being 1/9, the cut-off takes place during one firing cycle precisely, or conversely the energising takes place at least for the duration of one firing cycle, the thrust of the cam 12 on the piston 11 takes place during a much smaller fraction of the firing cycle. In the invention, which applies the "all or nothing" system in its entirety, the distributor will be fixed in such a manner that it will amply cover the duration of the injection before and after this injection.

Figure 3:
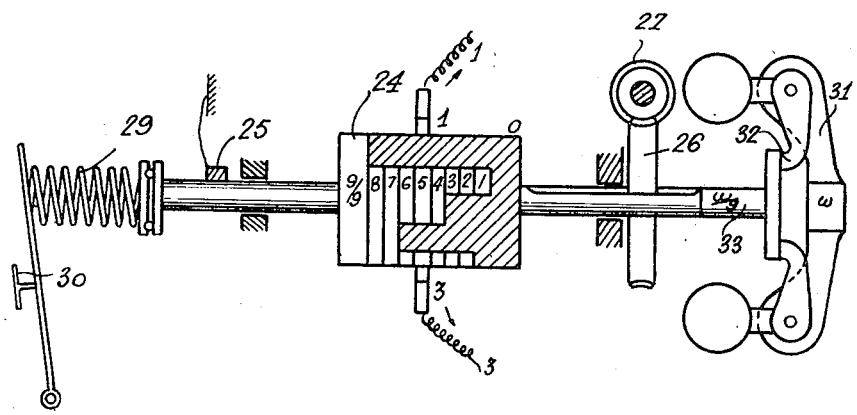
Fig. 3 is a side elevational view, partly in section, of the distributor and related portions of the structure shown in Fig. 1 as seen at right angles to the view shown in Fig. 1.

It might be worth while making the control of the charge partially automatic as a function of the speed of rotation and to constitute a governor limiting the possibilities of speed open to the driver. In Figure 3, a centrifugal governor 31, turning at the engine speed, bears, via the lever 32, on the shaft 33 of the distributor to displace it axially in the opposite direction to the accelerator by one or two charge fractions.

Starting with this centrifugal device, the following two limitation methods may be suggested.

1. It is desired not to exceed a given limiting speed, but it is desired to retain the maximum amount of acceleration, and consequently the full charge, substantially up to this limit. In this case, the centrifugal governor simply cuts the current to the electro-magnet during the time when the speed exceeds the predetermined speed. As soon as a speed very slightly below the limiting speed is reached, the current is restored and the charge can be maintained at its maximum.

2. Relying on the excellent output with reduced charges of such an engine, there is no longer any disadvantage in selecting an engine with a high cubic capacity and in bringing about, by means of the centrifugal governor, an axial movement of the distributor extending over the whole range of the distributor units. By this means such an engine is given considerable flexibility and it is possible to obtain a product of couple times speed which is substantially constant, and hence a power output which is approximately constant.

An example has just been taken of a two-stroke engine. The method employed would be exactly the same for a four-stroke engine, with the sole difference that the speed of rotation of the cam shaft for the injection pump would be ω/2 (ω being the speed of the crankshaft) and the distributor speed would be ω/18.

In the same way, it would be possible to devise a pneumatic device where the needle 18 would be controlled by a bottle of compressed air fed by a distributor similar to the distributor 24, but where the noninsulating sectors were replaced by apertures bringing the said passages into communication with the inside of the drum into which the compressed air would be introduced with all the necessary precautions. For example, the compressed air produced by a scavenging compressor or a supercharger could be used. Finally, a direct mechanical arrangement is possible by controlling the push-rod 18 directly by means of a series of cams, the profiles of which

Multi-cylinder engine

Everything which has just been said about a single-cylinder engine applies equally to a multi-cylinder engine, with the considerable advantage of a much more regular couple. The succession of cut-offs in the different cylinders may be achieved in three different ways:

1. They may overlap one another in such a manner that for a given charge fraction, all the cylinders work or rest in the same proportion. This result is obtained in Figures 1, 2 and 3 above, where it will be seen that there is illustrated not only the contact 1 on the distributor but also a contact 2, a contact 3 and a contact 4. These four contacts correspond to the four electro-magnets of a four cylinder injection pump supplying the two-stroke, four-cylinder engine (5). The only condition to be added to what has already been said is that the denominator of the charge fraction should be a prime number with the number of cylinders and this is the case here: the charge is divided into nine fractions, 9 being prime with 4 which is the number of cylinders, obviously the four contacts are arranged in the order of ignition, hence of injection.

Figure 4:
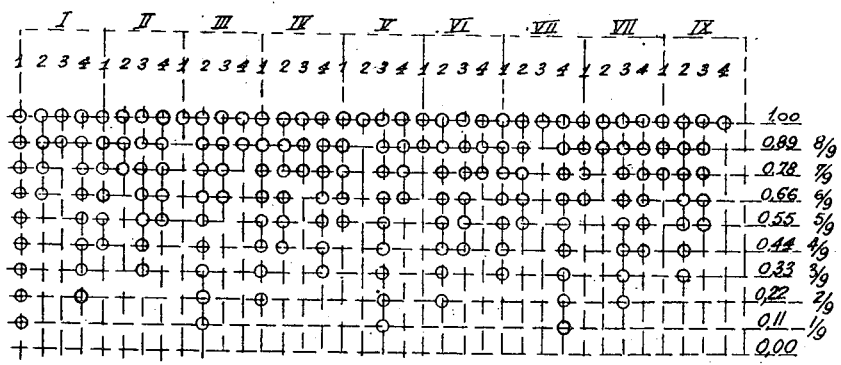
Fig. 4 is a diagrammatic view of the relationship of operating cycles and fuel charges corresponding to the various parts of the distributor in a multiple cylinder engine of the construction shown in Fig. 1.

The Figure 4 attached summarizes on the table the effect of the arrangements made in the case of the two-stroke engine which has just been discussed. The table comprises nine vertical columns (in Roman numerals) which represent nine operating cycles. In each of these columns there are shown the four cylinders in the order of ignition (in Arabic numerals). On the horizontal lines there is given the charge fraction in question: 1, 8/9, 7/9, and so on down to and including zero.

The intersection of the vertical lines corresponding to each cylinder and the horizontal lines corresponding to the charge fraction determines the moment when the injection should take place in the cylinder.

When there is a circle at this intersection there is a fuel injection; when there is no circle there is no injection. Thus the injection table is obtained for the period of nine cycles.

This table agrees very closely with the example taken in Figures 1, 2 and 3.

2. The cut-offs may first of all be made in one cylinder only until the whole of this cylinder is put out of action, after which they may continue in the following cylinder and so on. The advantage of this method in comparison with the first is that the charge can be subdivided much more easily, the disadvantage is that some cylinders will always be more charged than others.

Figure 5:
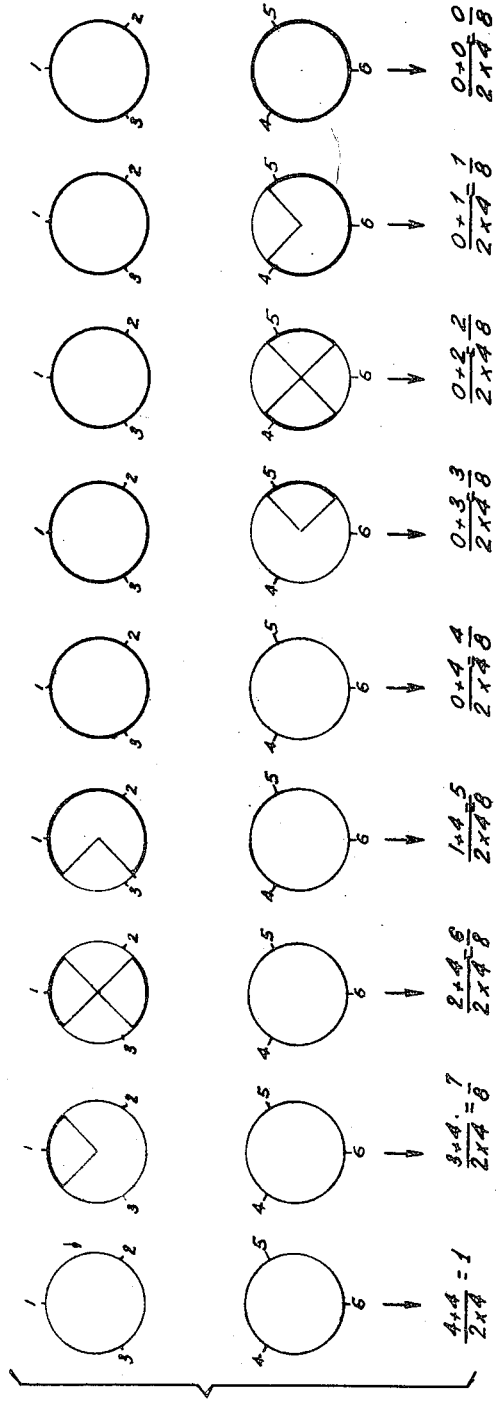
Fig. 5 shows the arrangement of distributor units of the two-halves of the engine of another embodiment of the invention.

3. It is possible to combine the two preceding methods, for example by splitting the engine into two equal engines and applying the first method of overlapping cut-offs to the first engine down to the point of total cut-off, then applying the same method succesively to the second engine. Figure 5 shows an example of a six-cylinder engine split up into two three-cylinder engines in which this method is applied. It will be noted that the denominator of the charge fraction is a prime number with three (number of of the cylinders in each half-engine).

Figure 6:
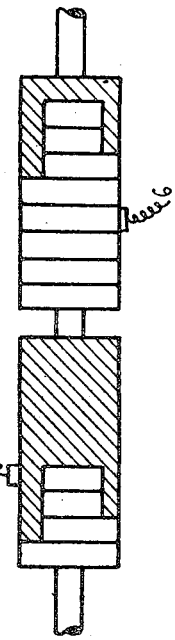
Fig. 6 is a side elevational view of the distributor units corresponding to the arrangement shown in Fig. 5.

Figures 5 and 6 (corresponding to Figures 2 and 3 in the previous example) represent the adjacent arrangement of the distributor units of the two halves of the engine in which it will be seen that from the charge 1 to the charge 4/8, the cylinders 1, 2 and 3 alone are subjected to injection cuts, then from the charge 4/8 to the charge 0, the cylinders 1, 2 and 3 being entirely cut out, the cylinders 4, 5 and 6 are progressively cut out in turn.

Figure 5 shows the position of the sliding contacts corresponding to the cylinders 1, 2, 3 and 4, 5, 6 as well as the different insulating sectors. Figure 6 shows the assembly of the distributor units forming two drums. A first drum on the left for the cylinders 1, 2 and 3, and a second drum on the right for the cylinders 4, 5 and 6. The three sliding contacts 1, 2, 3 are in the same plane, and the three sliding contacts 4, 5, 6 are in the same plane parallel to the first.

The longitudinal displacement of these drums, similar to the displacement brought about in the preceding example, always affects two distributor units. These are the ones which are situated on the same vertical line in Figure 5 and to which a predetermined charge fraction corresponds.

Figure 7:
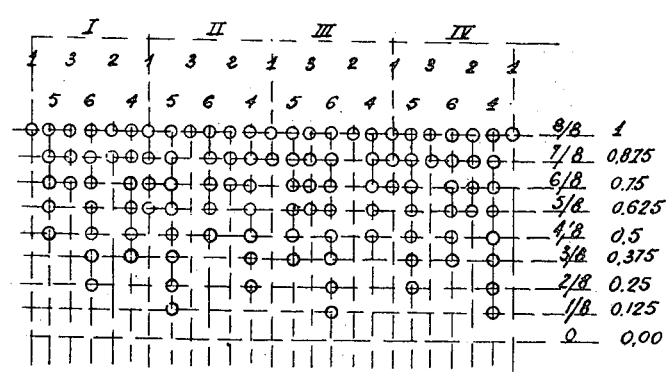
Fig. 7 is a diagrammatic view of the type shown in Fig. 4 but relating to another embodiment of the invention.

Figure 7 is a table summarizing the rhythm of the injections. It consists of four vertical columns (Roman numerals) representing the period of operation; each of these columns is split up into six columns, each representing one cylinder of the engine.

The six cylinders are arranged in the order of ignition and in two staggered horizontal lines so as to show clearly the division into two engines 1, 3, 2 and 5, 6, 4. The horizontal lines always represent the different charge fractions: 1, 7/8, 6/8 and so on, down to and including zero.

The points of intersection of the horizontal lines and the vertical lines represent the moment of injection for each cylinder and when the injection does, in fact, take place, these intersections are encircled.

It will be noted that in these various examples the charge zero is always reached, that is to say that no fuel is distributed throughout the engine. This case would occur when going downhill.

I claim:

1. In a piston engine constructed for fuel injection and controlled ignition wherein air admission is constant and corresponds to the quantity of air required for maximum power, means defining an injection circuit for each engine cylinder for injection of fuel, said circuit communicating with the cylinder and with a fuel injection pump, means defining a discharge orifice in said circuit for discharge of fuel from the circuit, a shut-off element for said orifice, and means for controlling the shut-off element to permit selective opening and closing of said orifice whereby the fuel supply through said circuit to the cylinder may be completely interrupted, said last-named means being adapted to cut-off the fuel supply to the cylinder and thereby to reduce the power of the engine to a power fraction, the numerator of which is equal to the number of fuel injections during a predetermined number of cycles which is equal to the denominator of said fraction.

2. In a multi-cylinder piston engine constructed for fuel injection and controlled ignition wherein air admission is constant and corresponds to the quantity of air required for maximum power, means defining an injection circuit for each engine cylinder for injection of fuel, said circuit communicating with the cylinder and with a fuel injection pump, means defining a discharge orifice in said circuit for discharge of fuel from the circuit, a shut-off element for said orifice, and means for controlling the shut-off element to permit selective opening and closing of said orifice whereby the fuel supply through said circuit to the cylinder may be completely interrupted, said last-named means being adapted to cut-off the fuel supply to the cylinder and thereby to reduce the power of the engine to a power fraction, the numerator of which is equal to the nmber of fuel injections during a predetermined number of cycles which is equal to the denominator of said fraction.

3. A piston engine as defined in claim 1, wherein said means for controlling the shut-off element comprises electrical means.

4. A piston engine as defined in claim 1, wherein said means for controlling the shut-off element includes a plurality of distributor units adapted to make one revolution during a complete injection period and having first surface portions provided with means to prevent fuel injection during a portion of one revolution and second surface portions permitting fuel injection during the other portion of said revolution.

5. A piston engine as defined in claim 1, wherein said means for controlling the shut-off element includes a plurality of distributor units adapted to make one revolution during a complete injection period and having first surface portions and contact means cooperating with said first surface portions to prevent fuel injection during a portion of one revolution and second surface portions permitting fuel injection during the other portion of said revolution.

6. A piston engine as defined in claim 5, wherein the distributor units are adjacently positioned on a single drum, said drum being mounted for axial displacement to bring the contact elements into selective engagement with said units.

7. A piston engine as defined in claim 4, wherein the distributor units are arranged in such manner that a cut-off of fuel injection effected during one charge fraction is maintained for all the lower charge fractions.

8. A piston engine as defined in claim 5, wherein an accelerator pedal is provided to displace the distributor drum axially.

9. A piston engine as defined in claim 8, wherein a centrifugal governor is positioned to displace the distributor drum axially in a direction opposite to that of said accelerator pedal.

10. A piston engine as defined in claim 1, wherein there is provided a centrifugal governor adapted to prevent fuel injection when the engine reaches a predetermined limiting speed.

11. A piston engine as defined in claim 1, wherein the shut-off element is controlled by pneumatic means.

12. A piston engine as defined in claim 1, wherein the shut-off element is controlled by a cam.

13. An engine as claimed in claim 1 having a single cylinder.

14. An engine as claimed in claim 1, and having multiple cylinders, wherein the cut-offs are applied successively to each cylinder.

15. An engine as claimed in claim 1 and having multiple cylinders, wherein the cut-off for the various cylinders overlaps and the denominator of the charge fraction is a prime number with the number of cylinders.

16. An engine as claimed in claim 1 and having multiple cylinders, said engine being divided into several multi-cylinder engines each of which the cut-off for the various cylinders overlaps and a change over to the following of said divisional multi-cylinder engines takes place only when the fuel to the first is completely cut-off.

References Cited in the file of this patent

UNITED STATES PATENTS

| | | |
|---|---|---|
| 630,213 | Gautier | Aug. 1, 1899 |
| 708,518 | Bossett | Sept. 9, 1902 |
| 1,038,598 | Kellum | Sept. 17, 1912 |
| 1,082,004 | Anthony | Dec. 23, 1913 |
| 1,125,204 | Stevens | Jan. 19, 1915 |
| 2,604,079 | Ray | July 22, 1952 |